United States Patent
Yamada (10) Patent No.: US 8,947,695 B2
(45) Date of Patent: Feb. 3, 2015

(54) INFORMATION PROCESSING DEVICE, INFORMATION PROCESSING METHOD AND COMPUTER-READABLE RECORD MEDIUM

(75) Inventor: Jun Yamada, Gifu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1135 days.

(21) Appl. No.: 12/344,990

(22) Filed: Dec. 29, 2008

(65) Prior Publication Data

US 2009/0168103 A1    Jul. 2, 2009

(30) Foreign Application Priority Data

Dec. 28, 2007   (JP) ................................ 2007-338645

(51) Int. Cl.
*G06F 3/12* (2006.01)
(52) U.S. Cl.
CPC .................. *G06F 3/1297* (2013.01)
USPC ......................... 358/1.15; 358/1.1
(58) Field of Classification Search
None
See application file for complete search history.

(56) References Cited

U.S. PATENT DOCUMENTS

| | | | | |
|---|---|---|---|---|
| 5,276,816 A | * | 1/1994 | Cavendish et al. | 715/835 |
| 5,367,626 A | * | 11/1994 | Morioka et al. | 715/837 |
| 5,546,527 A | * | 8/1996 | Fitzpatrick et al. | 715/769 |
| 5,559,948 A | * | 9/1996 | Bloomfield et al. | 715/835 |
| 5,689,286 A | * | 11/1997 | Wugofski | 715/835 |
| 6,266,042 B1 | * | 7/2001 | Aratani | 345/698 |
| 6,348,971 B2 | * | 2/2002 | Owa et al. | 358/1.15 |
| 7,286,782 B2 | * | 10/2007 | Nomura et al. | 399/79 |
| 8,368,917 B2 | * | 2/2013 | Yang | 358/1.15 |
| 2001/0043357 A1 | * | 11/2001 | Owa et al. | 358/1.15 |
| 2002/0021310 A1 | | 2/2002 | Nakai | |
| 2005/0207776 A1 | * | 9/2005 | Nomura et al. | 399/79 |
| 2007/0064253 A1 | * | 3/2007 | Yang | 358/1.13 |
| 2007/0171450 A1 | | 7/2007 | Yoshida | |
| 2008/0024818 A1 | * | 1/2008 | Ito | 358/1.15 |
| 2008/0278743 A1 | * | 11/2008 | Hardy et al. | 358/1.15 |

FOREIGN PATENT DOCUMENTS

| | | |
|---|---|---|
| JP | 06-004258 | 1/1994 |
| JP | 08-016354 | 1/1996 |
| JP | 2001-337765 | 12/2001 |
| JP | 2006-031347 | 2/2006 |
| JP | 2006031347 A * | 2/2006 |
| JP | 2007-199780 | 8/2007 |

\* cited by examiner

*Primary Examiner* — Marcus T Riley
(74) *Attorney, Agent, or Firm* — Banner & Witcoff, Ltd.

(57) ABSTRACT

An information processing device equipped with a data generating unit which generates print data from original data based on setting information (information on parameters which are selected in regard to multiple setting items, respectively) comprises an object generating unit which generates an object corresponding to possible setting information and a display control unit which makes a display unit display the objects which have been generated by the object generating unit while relatively increasing display level of relevant objects (objects relevant to an application that generated the original data) compared to other objects.

21 Claims, 9 Drawing Sheets

INFORMATION PROCESSING DEVICE, INFORMATION PROCESSING METHOD AND COMPUTER-READABLE RECORD MEDIUM

CROSS-REFERENCE TO RELATED APPLICATION

This application claims priority under 35 U.S.C. §119 from Japanese Patent Application No. 2007-338645 filed on Dec. 28, 2007. The entire subject matter of the application is incorporated herein by reference.

BACKGROUND

1. Technical Field

The present invention relates to an information processing device, an information processing method and a computer-readable record medium storing a program for information processing.

2. Prior Art

An information processing device disclosed in Japanese Patent Provisional Publication No. 2006-31347 (hereinafter referred to as '347 publication) is equipped with a data generating unit which generates print data from original data based on setting information (information on parameters which are selected in regard to multiple setting items, respectively). Examples of the setting item and corresponding parameters can include a setting item "sheet size" and parameters "legal", "letter" and "postcard", a setting item "sheet type" and parameters "plain paper" and "glossy paper", and a setting item "resolution" and parameters "1200 dpi" and "800 dpi", for example.

The information processing device according to '347 publication further includes an icon generating unit which generating an icon corresponding to the setting information and a display unit which displays the icons generated by the icon generating unit. Specifically, the "icon corresponding to the setting information" means a small button-like figure (graphic representation) displayed on a display screen, to which a picture, figure or the like representing the parameters has been added.

In the information processing device configured as above, the icon generating unit automatically generates an icon corresponding to each piece of setting information. Therefore, in the next print setting by the user, the user can easily recognize an icon corresponding to desired setting information and select such a desired icon, by just viewing the icons displayed on the display unit and comparing exterior shapes of the icons. Then, the data generating unit of the information processing device is capable of generating the print data from the original data based on the setting information corresponding to the selected icon. As above, the information processing device is capable of reducing the user's trouble of selecting the setting information.

However, in the above information processing device, the number of icons displayed on the display unit increases each time the setting information is newly set, which can make it difficult for the user to recognize which icon corresponds to what setting information. In such cases, it takes the user a long time to find a desired icon in a large number of icons displayed on the display unit. As a result, operability of the print setting is deteriorated contrary to the expectation.

SUMMARY OF THE INVENTION

The present invention, which has been made in consideration of the above problem, is advantageous in that an information processing device, an information processing method and a computer-readable record medium, capable of improving the operability of the print setting, can be provided.

In accordance with an aspect of the present invention, there is provided an information processing device equipped with a data generating unit which generates print data from original data based on setting information (information on parameters which are selected in regard to multiple setting items, respectively), comprising an object generating unit which generates an object corresponding to possible setting information and a display control unit which makes a display unit display the objects which have been generated by the object generating unit while relatively increasing display level of relevant objects, as objects relevant to an application that generated the original data, compared to other objects.

In the information processing device, the "object" means a figure (graphic representation) which is displayed on a display screen (display unit) or such a figure combined with characters (letters), a figure (picture) or a symbol (or a combination of such elements). Examples of the object can include an icon, a setting item in a user interface (dialog box), etc. The object may be of any size as long as the whole object can be displayed on the display screen and the object is visually recognizable to the user.

In the information processing device configured as above, the display control unit makes the display unit display the objects while relatively increasing the display level of the relevant objects (objects relevant to the application that generated the original data) compared to other objects.

The above expression "relatively increasing the display level of the relevant objects compared to other objects" means increasing recognizability of the relevant objects to the user (by enlarging the size, increasing color density, using a conspicuous background color, etc.) relative to the other objects so that the relevant objects are recognized by the user with higher priority than the other objects. The "relatively increasing the display level of the relevant objects compared to other objects" can also be implemented by reducing the display level of the other objects while keeping that of the relevant objects at the original level, or by increasing the display level of the relevant objects while also reducing that of the other objects. The "reducing the display level of the other objects" can include not displaying the other objects.

With the display control unit configured as above, the information processing device lets the user recognize the relevant objects with higher priority than the other objects. The user is allowed to easily recognize the relevant objects even when there are a lot of objects displayed on the display unit. Thus, the information processing device allows the user to easily find a desired object in a large number of objects displayed on the display unit.

Thus, the information processing device in accordance with the present invention is capable of improving the operability of the print setting.

Examples of the setting item and corresponding parameters can include a setting item "sheet size" and parameters "legal", "letter" and "postcard", a setting item "sheet type" and parameters "plain paper" and "glossy paper", and a setting item "resolution" and parameters "1200 dpi" and "800 dpi", for example.

The "setting information" can mean not only parameter set information (indicating a set of parameters selected in regard to the multiple setting items, respectively) but also information indicating only one parameter selected from multiple parameters in regard to one setting item.

In accordance with another aspect of the present invention, there is provided an information processing method for an information processing device having a data generating function of generating print data from original data based on setting information as information on parameters which are selected in regard to multiple setting items, respectively. The information processing method comprises an object generating step of generating an object corresponding to possible setting information and a display control step of making a display unit display the objects which have been generated by the object generating step while relatively increasing display level of relevant objects (objects relevant to an application that generated the original data) compared to other objects.

With the information processing method, the operability of the print setting can be improved similarly to the information processing device described above.

In accordance with another aspect of the present invention, there is provided a computer-readable record medium storing computer-readable instructions that cause an information processing device having a data generating function of generating print data from original data based on setting information as information on parameters which are selected in regard to multiple setting items, respectively, to execute an object generating step of generating an object corresponding to possible setting information and a display control step of making a display unit display the objects which have been generated by the object generating step while relatively increasing display level of relevant objects (as objects relevant to an application that generated the original data) compared to other objects.

With the computer-readable record medium, the operability of the print setting can be improved by making the information processing device function as above.

Other objects, features and advantages of the present invention will become more apparent from the consideration of the following detailed description taken in conjunction with the accompanying drawings.

DETAILED DESCRIPTION OF THE EMBODIMENT

Referring now to the drawings, a description will be given in detail of a preferred embodiment in accordance with the present invention.

Figure 1:
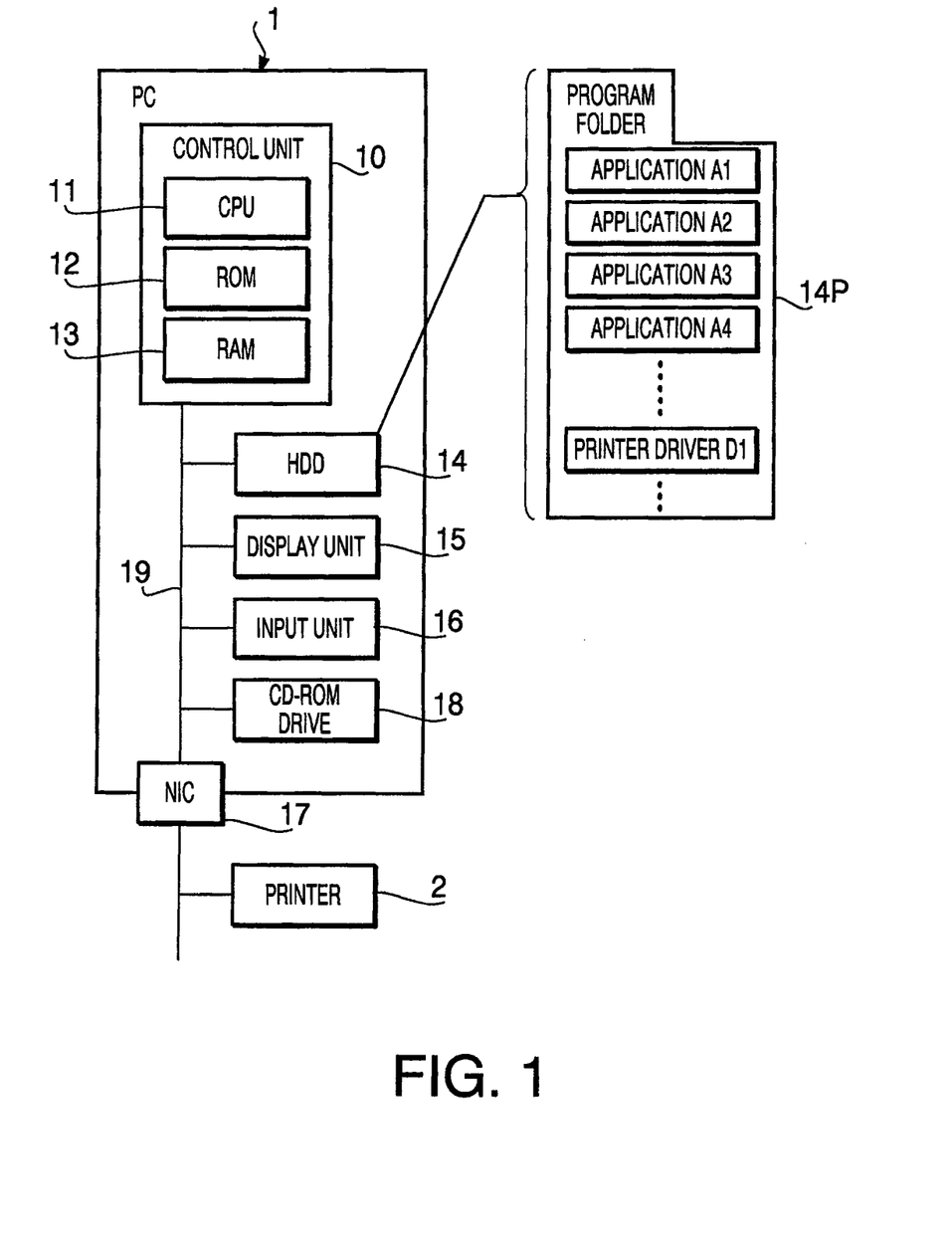
FIG. 1 is a block diagram showing the basic composition of a PC (Personal Computer) as an information processing device in accordance with an embodiment of the present invention.

FIG. 1 is a block diagram showing the basic composition of a PC (Personal Computer) 1 as an information processing device in accordance with an embodiment of the present invention. The PC 1 includes a control unit 10, an HDD (Hard Disk Drive) 14 storing various programs and data, a display unit 15, an input unit 16, a NIC (Network Interface Card) 17 (e.g. LAN adaptor) for the connection of the PC 1 to a network 5, and a CD-ROM drive 18 for reading out data from a CD-ROM. The components are connected together by an internal bus 19 for data communication. Incidentally, the information processing device in accordance with the present invention is not restricted to such a PC 1; the present invention is applicable also to other information processing devices such as PDAs (Personal Digital Assistants).

The PC 1 forms a network system together with peripheral devices (e.g. printer 2) which are connected thereto via the network 5 (e.g. LAN (Local Area Network)). The printer 2 is a peripheral device having the function of printing an image, text, etc. on a sheet based on print data (including graphic data, text data, etc.) sent from the PC 1 (so-called printer function). The connection between the PC 1 and the peripheral devices (e.g. printer 2) may also be implemented by direct connection by use of serial cables, USB (Universal Serial Bus) cables, etc., without using a network 5.

In the PC 1, the display unit 15, as a display device such as an LCD (Liquid Crystal Display), is connected to the control unit 10 via a video board or graphic board (not shown). The display unit 15 displays a variety of information as needed, such as a mouse pointer and a print setting UI (User Interface) screen to be used for the setting of setting information which will be explained later. The display on the display unit 15 is implemented by the well-known GUI (Graphical User Interface) function of the PC 1.

The input unit 16, including input devices such as a keyboard and a mouse, is connected to the control unit 10 via a USB terminal, PS/2 terminal, etc. (not shown). The user can input a variety of information to the control unit 10 by operating the input unit 16. According to the user operation, the input unit 16 can also send the user's setting inputs in regard to the setting information related to the printer 2 (selection of parameters regarding various setting items) to the control unit 10.

The control unit 10, for the centralized control of the components of the PC 1, includes well-known modules such as a CPU 11 (Central Processing Unit), a ROM 12 (Read Only Memory) and a RAM 13 (Random Access Memory). In the PC 1, a circuit board on which the modules of the control unit 10 (CPU 11, ROM 12, RAM 13, etc.) are mounted is generally called a "mother board".

A variety of software (e.g. application software which will be described later) operates on the PC 1, in an environment of an OS (Operating System) which has been installed in the PC 1. While this embodiment will be described below assuming that a Windows® OS has been installed in the PC 1, the present invention is applicable also to information processing devices (PCs, PDAs, etc.) in which a different operation system has been installed.

The HDD 14 includes high-capacity discs and a reading unit which are integrated in one body. In the HDD 14, folders such as a system folder (for storing various system files necessary for the operation of the OS) and a program folder 14P (for storing various programs such as a printer driver D1 and the aforementioned application software (applications A1, A2, A3, A4, etc.)) have been formed.

Each of the applications (A1-A4, etc.) is software which operates in the OS environment for carrying out particular information processing (document preparation, numerical calculations, etc.) in cooperation with the control unit 10, the HDD 14, the display unit 15, the input unit 16, etc.

In this embodiment, the application A1 is assumed to be software for photo editing or picture drawing, which handles graphic data (i.e. image data that can include figures, photos, etc.) such as bitmap data (representing a set of dots) and wire-frame data (specifying a line drawing or the like by coordinates). The application A2 is assumed to be software for document preparation, which handles text data (made up of text codes representing characters, symbols, etc.).

The printer driver D1 is software for making the printer 2 execute printing. Specifically, the printer driver D1 makes the setting of the setting information by displaying the print setting UI screen on the display unit 15 of the PC 1 and receiving setting inputs from the user. The "setting information" means information on the parameters which are selected in regard to multiple setting items, respectively. Examples of the setting item and corresponding parameters can include a setting item "sheet size" and parameters "legal", "letter" and "postcard", a setting item "sheet type" and parameters "plain paper" and "glossy paper", and a setting item "resolution" and parameters "1200 dpi" and "800 dpi", for example. The "setting information" can mean not only parameter set information (indicating a set of parameters selected in regard to the multiple setting items, respectively) but also information indicating only one parameter selected from multiple parameters in regard to one setting item. The printer driver D1 makes the control unit 10 generate print data from original data based on the setting information and then transmits the print data to the printer 2 via the NIC 17 to make the printer 2 carry out the printing.

The installation of such a program (application A1-A4, printer driver D1, etc.) is carried out through, for example, data reading by the CD-ROM drive 18 from a CD-ROM storing the program, various settings by the control unit 10, and storing of the program (after the setting) in the HDD 14.

The user can activate the applications A1-A4, etc. and edit desired document data, drawing data, etc. (hereinafter referred to as "original data") by properly operating the PC 1 configured as above.

When the user wants to print out the edited original data with the printer 2, the user can instruct the PC 1 to activate the print setting UI screen by clicking on an icon representing the original data, or by selecting "PRINT SETTING" from a menu bar by operating the input unit 16 when an application (A1-A4, etc.) has already been activated. In response to the instruction, the printer driver D1 is activated and the print setting UI screen is displayed on the display unit 15. Through the print setting UI screen, the user can make the setting of the setting information (information on the selected parameters) by selecting a desired parameter from parameters corresponding to each of the multiple setting items ("sheet size", "sheet type", "resolution", etc.).

Thereafter, when a print execution instruction is issued by the user by operating the input unit 16, the print data is generated by the control unit 10 from the (edited) original data based on the setting information. The print data is transmitted to the printer 2 via the NIC 17 and printed on a sheet by the printer 2.

In the PC 1 functioning as above, operability of the print setting is improved by properly controlling "display level" of the setting items and print setting icons displayed on the print setting UI screen so as to facilitate user recognition, by executing a "process in response to a print setting UI screen activation instruction" and a "process in response to a print setting registration UI screen activation instruction" which will be explained in detail below.

<1. Process in Response to Print Setting UI Screen Activation Instruction>

Figure 2:
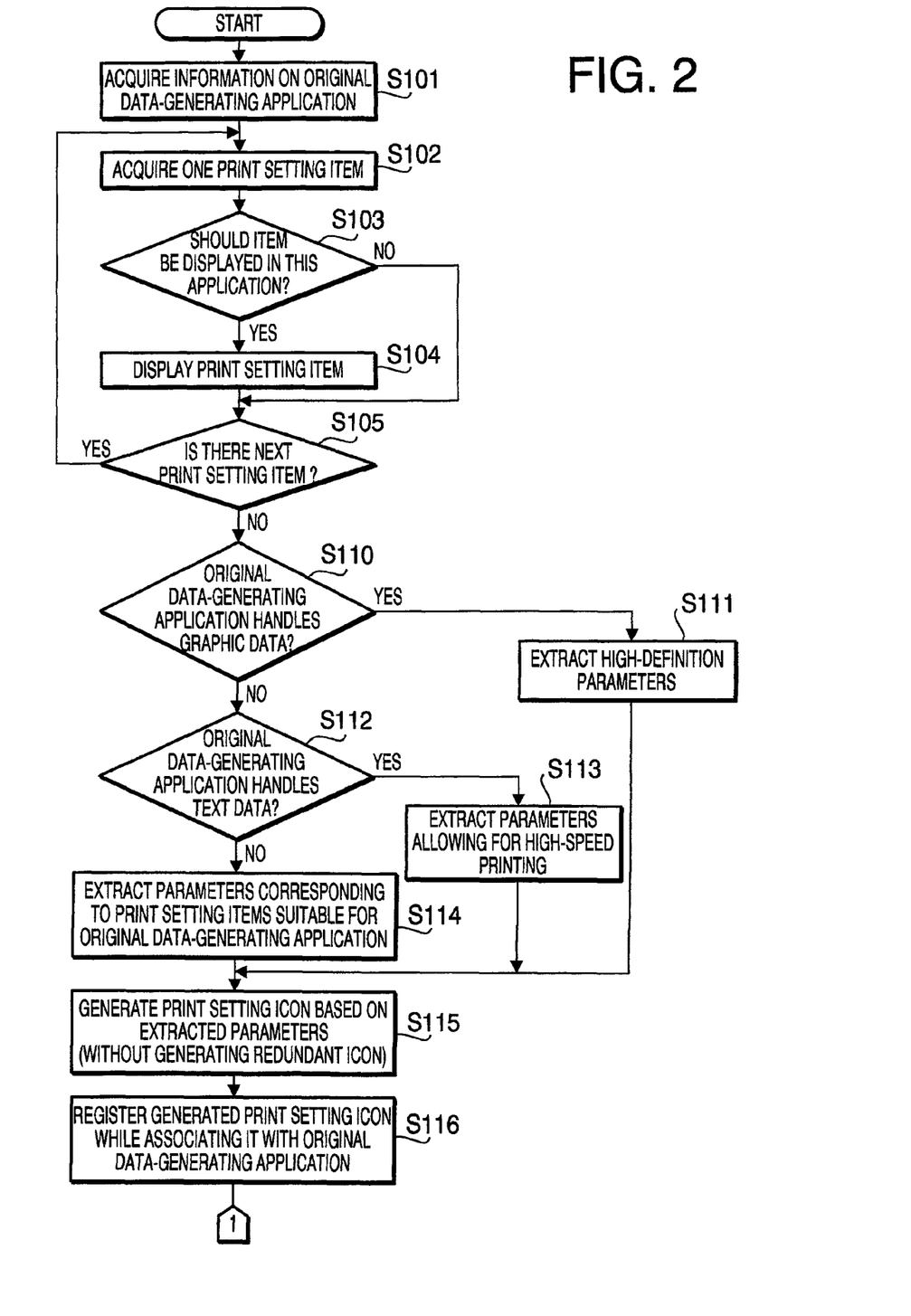
FIGS. 2 and 3 are flow charts showing a print setting UI screen activation process which is executed by a control unit of the PC in response to a print setting UI screen activation instruction.
Figure 3:
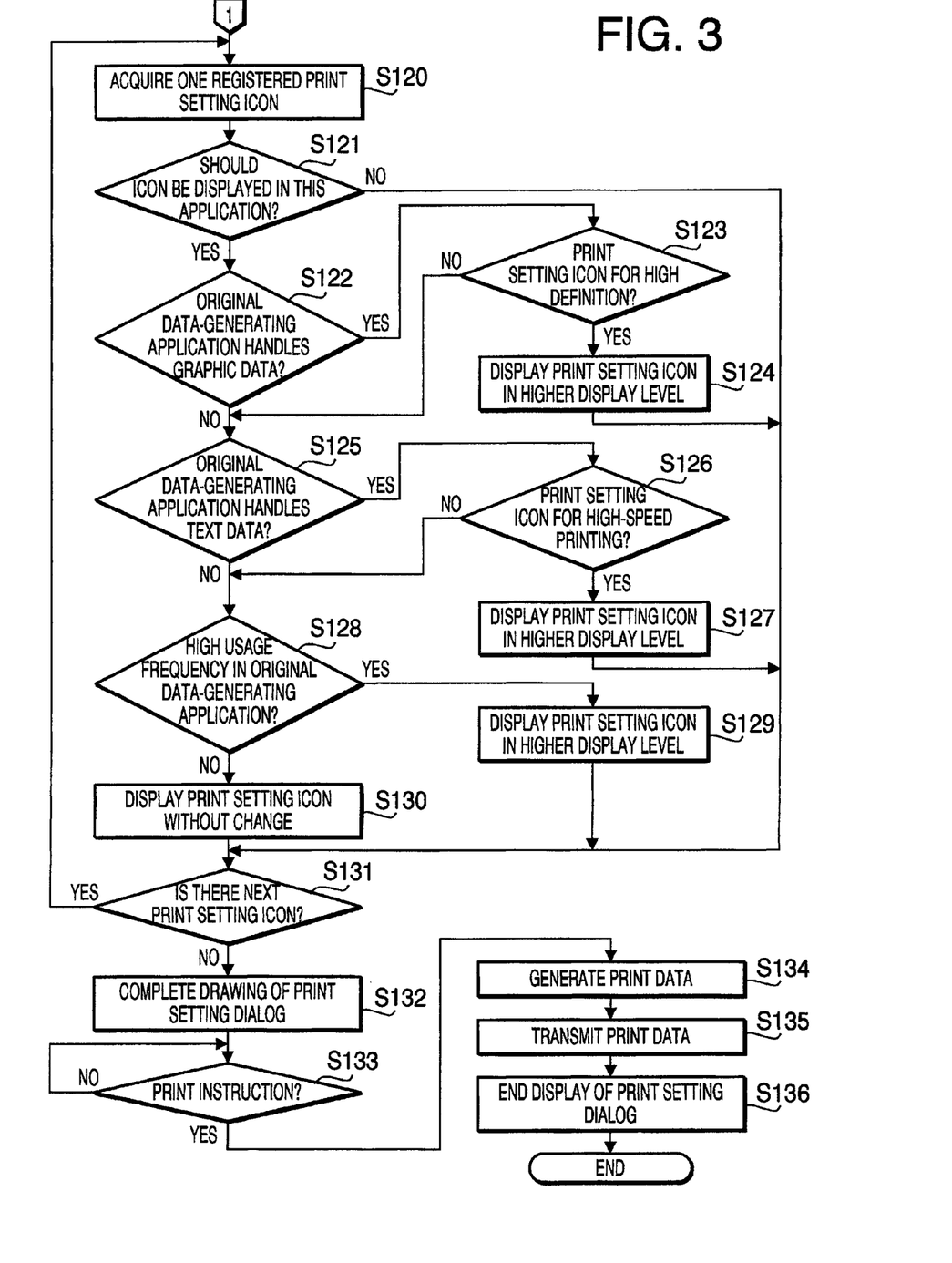
Figure 4:
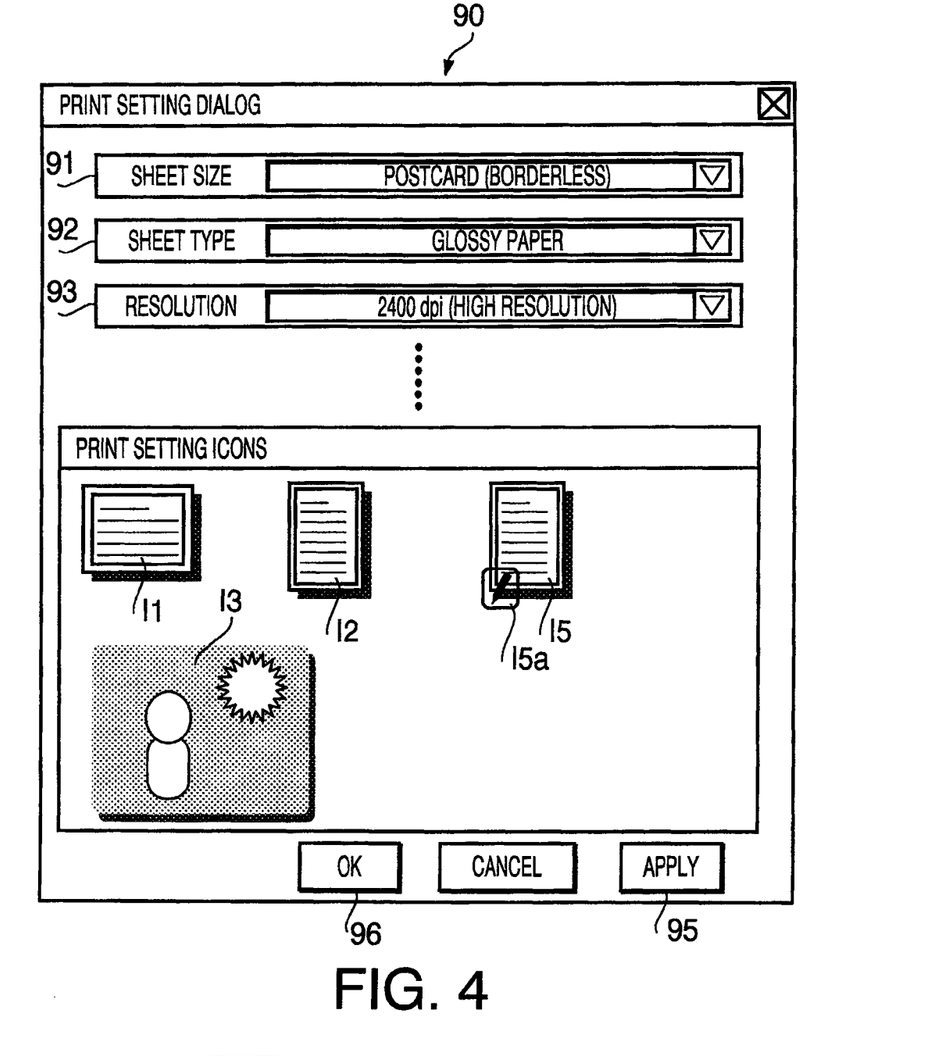
FIG. 4 is a screen image showing an example of a print setting UI screen which is displayed on a display unit of the PC by the print setting UI screen activation process.

When the print setting UI screen activation instruction (instruction for the activation of the print setting UI screen) is issued by the user of the PC 1 by clicking on an icon representing the original data to be printed out or by selecting "PRINT SETTING" from the menu bar by operating the input unit 16 when an application (A1-A4, etc.) has already been activated, the printer driver D1 is activated and a print setting UI screen activation process shown in FIGS. 2 and 3 is executed by the control unit 10. FIGS. 2 and 3 are flow charts showing the print setting UI screen activation process. FIG. 4 is a screen image showing an example of the print setting UI screen (90) which is displayed on the display unit 15 by the print setting UI screen activation process. Each step of the process will be described below.

At the start of the print setting UI screen activation process, the control unit 10 executes a process for selecting setting items to be displayed on the print setting UI screen (steps S101-S105 shown in FIG. 2).

First, in the step S101, the control unit 10 acquires information on the application that generated the original data as the target of the print setting (hereinafter referred to as an "original data-generating application"). For example, when the original data was generated by the application A1, the control unit 10 acquires information that the original data-generating application is the application A1.

In the next step S102, the control unit 10 acquires (selects) one setting item from the multiple setting items used for the print setting. The setting items can include, for example, "sheet size", "sheet type", "resolution", "stamp setting" (a setting for overprinting a stamp like "SECRET", "FOR CIRCULATION" or "URGENT" on a document), etc.

In the next step S103, the control unit 10 judges whether the acquired setting item is a setting item that should be displayed in the original data-generating application or not. For example, when the original data-generating application is the application A1 which handles graphic data, the usage frequency of the above setting item "stamp setting" can be regarded to be extremely low, and thus the "stamp setting" can be judged to be a setting item that should not be displayed in the application A1 (original data-generating application). Incidentally, this judgment is not absolute; it is desirable that the judgment be changeable by the user.

If affirmative in S103 (S103: YES), the control unit 10 advances to step S104 and displays the acquired setting item on the print setting UI screen 90. For example, when the acquired setting item (resulting in "YES" in S103) is "sheet size", the setting item "sheet size" (91) is displayed on the print setting UI screen 90 as shown in FIG. 4. Thereafter, the control unit 10 advances to step S105 as shown in FIG. 2.

On the other hand, if negative in S103 (S103: NO), the control unit 10 advances to the step S105 while skipping the step S104 (without displaying the acquired setting item on the print setting UI screen 90).

In the step S105, the control unit 10 judges whether the next setting item to be acquired exists. If affirmative in S105 (S105: YES), the control unit 10 returns to S102 and thereafter repeats the steps S102-S105 for each acquirable setting item until the step S105 results in "NO".

If negative in S105 (S105: NO), that is, when the judgment on whether each setting item should be displayed on the print setting UI screen 90 or not has been finished for all the setting items, the control unit 10 advances to step S110. At this point, assuming that the acquired setting items resulting in "YES" in S103 are "sheet size", "sheet type", "resolution", etc., for example, the setting items "sheet size" (91), "sheet type" (92), "resolution" (93), etc. have been displayed on the print setting UI screen 90 as shown in FIG. 4. By the above steps S101-S105, setting items irrelevant to the original data-generating application are left out of the print setting UI screen 90, by which unnecessary user operation (trouble to the user) is eliminated.

Subsequently, the control unit 10 executes a process for generating print setting icons relevant to the original data-generating application (relevant print setting icons) (steps S110-S116).

First, in the step S110, the control unit 10 judges whether the original data-generating application is an application that handles graphic data or not.

If affirmative in S110 (S110: YES), the control unit 10 advances to step S111 and extracts (selects) a high-definition parameter from the multiple parameters corresponding to each setting item which has been displayed on the print setting UI screen 90. For example, when the original data-generating application is the application A1 which handles graphic data, the judgment of S110 results in "YES" and the control unit 10 advances to the step S111, in which a high-definition parameter ("postcard (borderless)", "glossy paper", "2400 dpi (high resolution)", "color printing", etc.) is extracted from the multiple parameters corresponding to each setting item displayed on the print setting UI screen 90 ("sheet size" (91), "sheet type" (92), "resolution" (93), etc.). Thereafter, the control unit 10 advances to step S115.

On the other hand, if negative in S110 (S110: NO), the control unit 10 advances to step S112 and judges whether the original data-generating application is an application that handles text data or not.

If affirmative in S112 (S112: YES), the control unit 10 advances to step S113 and extracts (selects) a parameter allowing for high-speed printing from the multiple parameters corresponding to each setting item which has been displayed on the print setting UI screen 90. For example, when the original data-generating application is the application A2 which handles text data, the judgment of S112 results in "YES" and the control unit 10 advances to the step S113, in which a parameter allowing for high-speed printing ("800 dpi (low resolution)", "monochrome printing", "N in 1 printing", etc.) is extracted from the multiple parameters corresponding to each setting item (91-93, etc.) displayed on the print setting UI screen 90. Thereafter, the control unit 10 advances to the step S115.

On the other hand, if negative in S112 (S112: NO), the control unit 10 advances to step S114 and extracts parameters corresponding to print setting items suitable for the original data-generating application.

As a concrete method for the parameter extraction in S111, S113 and S114, it is possible to prepare a table (in which the applications A1-A4, etc. and parameters corresponding to each of the applications have been registered) and carry out the parameter extraction by referring to the table.

In the step S115 (reached via the step S111, S113 or S114), the control unit 10 generates a print setting icon based on the extracted parameters. The print setting icon serves as an "object" corresponding to the setting information (information on the parameters which are selected in regard to the multiple setting items, respectively). In this embodiment, the "object" means a figure (graphic representation) which is displayed on the display unit 15 or such a figure combined with characters (letters), a figure (picture) or a symbol (or a combination of such elements).

Figure 5:
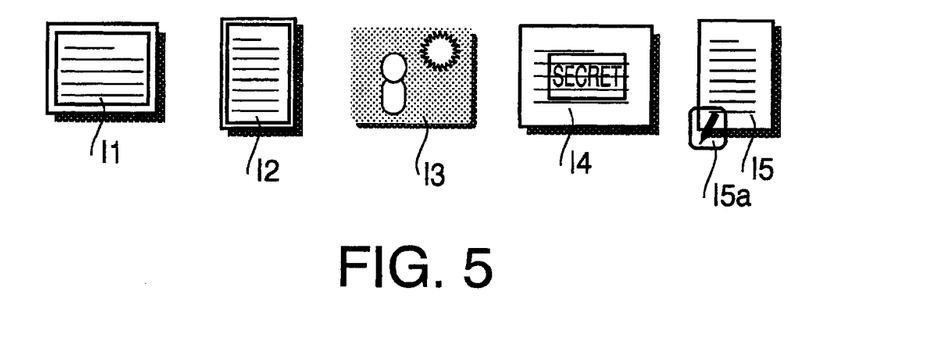
FIG. 5 is a schematic diagram showing concrete examples of print setting icons which are displayed on the display unit.

FIG. 5 is a schematic diagram showing concrete examples of the print setting icons displayed on the display unit 15. In FIG. 5, the print setting icon I1 represents low resolution (for document printing) and landscape printing (printing on a sheet in the landscape orientation). The print setting icon I2 represents low resolution (for document printing) and portrait printing (printing on a sheet in the portrait orientation). The print setting icon I3 represents postcard printing (borderless printing), glossy paper printing and high resolution (for photo printing). The print setting icon I4 represents the overprinting of the "SECRET" stamp, as well as the low resolution and landscape printing represented by the print setting icon I1. The print setting icon I5 (the print setting icon I2 on which an application icon I5a (like a pen) representing the application A2 handling text data is overlaid) indicates that the icon (originally, the print setting icon I2) is relevant to the application A2.

As shown in the step S115 in FIG. 2, when a print setting icon to be generated based on the extracted parameters has already been registered, the generation of the print setting icon is canceled in S115 to avoid redundancy. In the step S115, it is also possible to automatically generate two or more print setting icons by properly changing the combination of the extracted parameters.

In the next step S116, the control unit 10 registers the generated print setting icon while associating it with the original data-generating application. For example, when the original data-generating application is the application A1 handling graphic data and the print setting icon I3 shown in FIG. 5 has been generated in S115, the print setting icon I3 is registered while being associated with the application A1. In other words, the print setting icon I3 serves as a "relevant object" of the application A1 (i.e. an object relevant to the application A1). Information on the registered print setting icon is recorded in the control unit 10 or the HDD 14 so that it can be read out as needed.

In the flow shown in FIG. 2, an object (e.g. print setting icon) corresponding to possible setting information is generated by the steps S110-S115. In the steps S110-S114, parameters selectable in regard to setting items relevant to the original data-generating application are extracted. In the extraction steps S110-S114, when the original data-generating application is an application handling graphic data (S110: YES), parameters enabling the control unit 10 to generate high-definition print data are extracted in the step S111. When the original data-generating application is an application handling text data (S112: YES), parameters enabling the control unit 10 to generate print data allowing for high-speed printing are extracted in the step S113.

In the case where the original data-generating application handles graphic data (S110: YES), it is highly likely that the user (making the print setting for the original data) selects parameters allowing for high-definition printing. Since a relevant object (e.g. relevant print setting icon) allowing for high-definition printing of the original data is automatically generated in S115 in this case, the user is allowed to select the relevant object for the print setting with ease, by which the operability of the print setting is improved.

In the case where the original data-generating application handles text data (S112: YES), it is highly likely that the user (making the print setting for the original data) selects parameters allowing for high-speed printing. Since a relevant object (e.g. relevant print setting icon) allowing for high-speed printing of the original data is automatically generated in S115 in this case, the user is allowed to select the relevant object for the print setting with ease, by which the operability of the print setting is improved.

The print setting icon generated by the object generating steps S110-S115 is registered while being associated with the original data-generating application in the step S116 (first registration).

Subsequently, the control unit 10 executes a process for displaying the registered print setting icons (print setting icons which have already been registered at this point) on the print setting UI screen 90 while controlling their display levels (steps S120-S133 shown in FIG. 3).

First, in the step S120, the control unit 10 acquires (selects) one print setting icon from the registered print setting icons.

In the next step S121, the control unit 10 judges whether or not the acquired print setting icon is a print setting icon that should be displayed in the original data-generating application. For example, when the original data-generating application is the application A1 handling graphic data, the usage frequency of the print setting icon I4 shown in FIG. 5 (representing the overprinting of the "SECRET" stamp) can be regarded to be extremely low, and thus the print setting icon I4 can be judged to be a print setting icon that should not be displayed in the application A1 (original data-generating application). Incidentally, this judgment is not absolute; it is desirable that the judgment be changeable by the user. For example, the user may be allowed to set (determine) one or more applications that should display a particular print setting icon, by selecting one of three buttons 84-86 on a print setting registration UI screen 80 (see FIG. 8, explained later) which is displayed in the "process in response to a print setting registration UI screen activation instruction" which will be explained later.

If negative in S121 (S121: NO), the control unit 10 advances to step S131 while skipping steps S122-S130 (without displaying the acquired print setting icon on the print setting UI screen 90). If affirmative in S121 (S121: YES), the control unit 10 advances to step S122.

In the step S122, the control unit 10 judges whether the original data-generating application is an application that handles graphic data or not. For example, when the original data-generating application is the application A1 handling graphic data, the judgment of S122 results in "YES" and the control unit 10 advances to step S123 (explained later). When the original data-generating application is the application A2 handling text data, the judgment of S122 results in "NO" and the control unit 10 advances to step S125.

In the step S125, the control unit 10 judges whether the original data-generating application is an application that handles text data or not. For example, when the original data-generating application is the application A2 handling text data, the judgment of S125 results in "YES" and the control unit 10 advances to step S126 (explained later). When the original data-generating application is the application A1 handling graphic data, the judgment of S125 results in "NO" and the control unit 10 advances to step S128.

In the step S128, the control unit 10 judges whether the usage frequency of the acquired print setting icon in the original data-generating application is high or not. Specifically, the usage frequency of each registered print setting icon in each application may be recorded in the control unit 10 or the HDD 14 to be referred to for the judgment of S128. If affirmative in S128 (S128: YES), the control unit 10 advances to step S129 (explained later), otherwise (S128: NO) the control unit 10 advances to step S130.

In the step S130, the control unit 10 displays the acquired print setting icon on the print setting UI screen 90. In this case, the print setting icon is displayed without controlling its display level (in its initial size) like the print setting icons I1, I2 and I5 shown in FIG. 4.

In the next step S131, the control unit 10 judges whether the next print setting icon to be acquired exists. If affirmative in S131 (S131: YES), the control unit 10 returns to the step S120.

If negative in S131 (S131: NO), that is, when the judgment on whether each print setting icon should be displayed on the print setting UI screen 90 or not and the control of the display level have been finished for all the registered print setting icons, the control unit 10 advances to step S132 and completes the drawing of the print setting UI screen 90.

Thereafter, when a desired print setting icon is selected from the print setting UI screen 90 by the user through the input unit 16 and the selection is confirmed (e.g. by clicking on the "APPLY" button 95 and the OK button 96 at the bottom of the print setting UI screen 90) (S133: YES), the control unit 10 generates print data from the original data by use of the setting information that has been associated with the selected print setting icon (S134), transmits the generated print data to the printer 2 via the NIC 17 to make the printer 2 print out the print data on a sheet (S135), ends the display of the print setting UI screen 90 (S136), and ends the process of FIGS. 2 and 3.

Meanwhile, in the step S123, the control unit 10 judges whether the acquired print setting icon is a print setting icon for making the control unit 10 generate high-definition print data from the original data or not. For example, when the acquired print setting icon is the print setting icon I3 shown in FIG. 5 (representing high resolution, etc.), the judgment of S123 results in "YES" and the control unit 10 advances to step S124. If negative in S123 (S123: NO), the control unit 10 advances to the step S125 and executes subsequent steps as explained above.

In the step S124, the control unit 10 displays the acquired print setting icon on the print setting UI screen 90 while executing control for increasing the display level of the icon. In the example of FIG. 4, the display level of the print setting icon I3 is increased from the normal display level so as to exaggerate the icon I3 compared to the other print setting icons I1, I2 and I5. While the control for increasing the display level of a print setting icon is executed by enlarging the icon in FIG. 4, the control may be carried out by other methods, such as increasing the brightness of color of the icon or increasing the contrast of the icon. Thereafter, the control unit 10 advances to the step S131 and executes subsequent steps as explained above.

Meanwhile, in the step S126, the control unit 10 judges whether the acquired print setting icon is a print setting icon for making the control unit 10 generate print data allowing for high-speed printing from the original data or not. For example, when the acquired print setting icon is the print setting icon I1 shown in FIG. 5 (representing low resolution, etc.), the judgment of S126 results in "YES" and the control unit 10 advances to step S127. If negative in S126 (S126: NO), the control unit 10 advances to the step S128 and executes subsequent steps as explained above.

In the step S127, the control unit 10 displays the acquired print setting icon on the print setting UI screen 90 while executing the control for increasing the display level of the icon similarly to the step S124 (repeated explanation is omitted here). Thereafter, the control unit 10 advances to the step S131 and executes subsequent steps as explained above.

Meanwhile, in the step S129, the control unit 10 displays the acquired print setting icon on the print setting UI screen 90 while executing the control for increasing the display level of the icon similarly to the steps S124 and S127 (repeated explanation is omitted here). Thereafter, the control unit 10 advances to the step S131 and executes subsequent steps as explained above.

After the steps S101-S132 are finished, the user is allowed to select a desired print setting icon from the icons (e.g., I1, I2, I3 and I5 shown in FIG. 4) displayed on the print setting UI screen 90. The user can also manually select a desired parameter by operating one of the setting items (91-93, etc.) displayed on the print setting UI screen 90.

In the above process of FIGS. 2 and 3, display control for displaying the relevant print setting icons (print setting icons relevant to the original data-generating application) on the display unit 15 in a higher display level compared to the other print setting icons is carried out in the steps S124, S127, S129 and S130. In the example of FIG. 4 in which the original data-generating application is assumed to be the application A1 (handling graphic data), the print setting icon I3 is regarded as the relevant print setting icon (while the print setting icons I1, I2, I4 and I5 are regarded as "other print setting icons"). In this example, the relevant print setting icon I3 on the display unit 15 is displayed in a size larger than its initial size by the display control (S124, S127, S129, S130). As for the other print setting icons I1, I2, I4 and I5, the display control (S124, S127, S129, S130) displays only the icons I1, I2 and I5 on the display unit 15 in their initial sizes, without displaying the icon I4 (print setting icon that should not be displayed in the original data-generating application (S121: NO)).

<2. Process in Response to Print Setting Registration UI Screen Activation Instruction>

Figure 6:
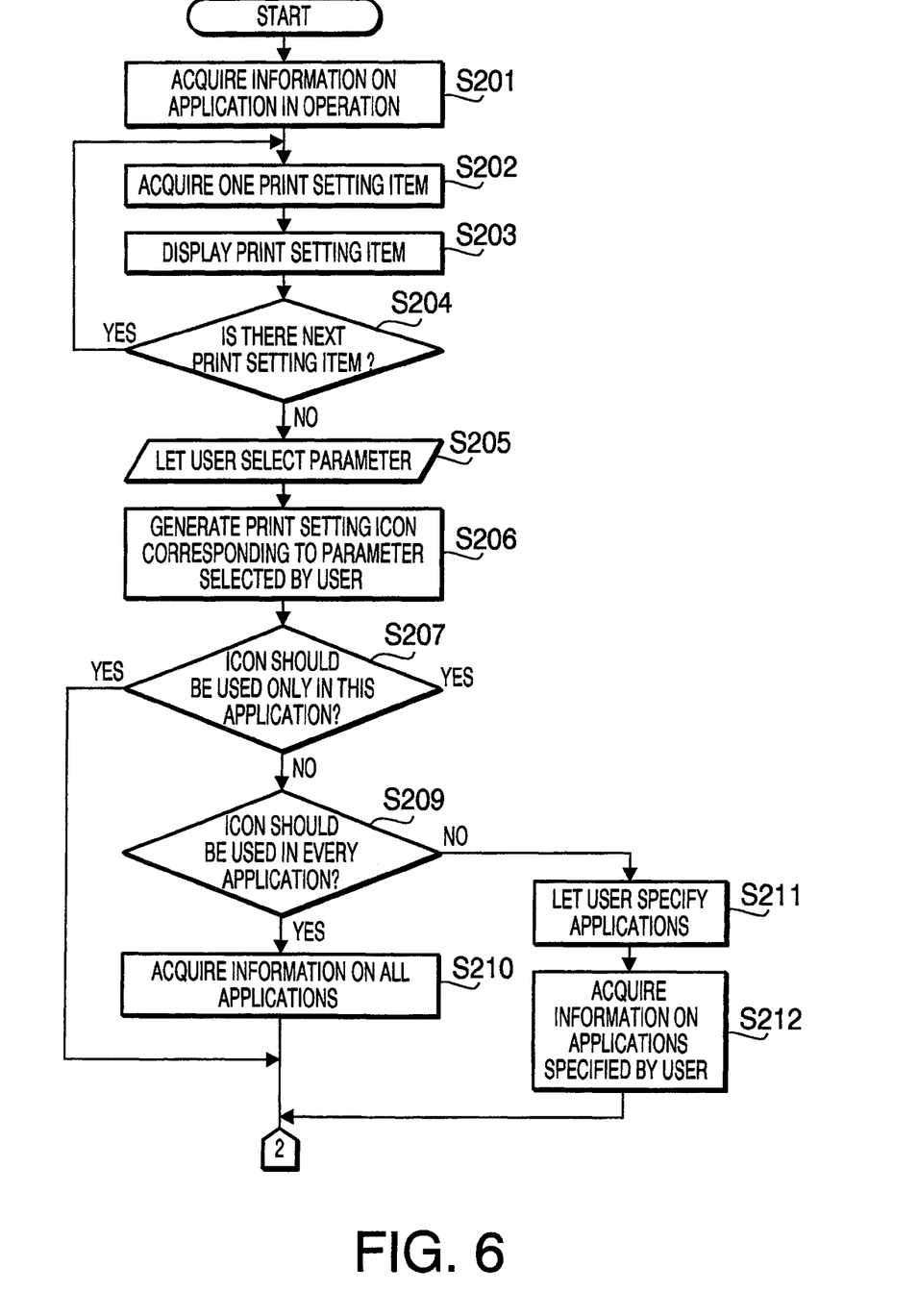
FIGS. 6 and 7 are flow charts showing a print setting registration UI screen activation process which is executed by the control unit in response to a print setting registration UI screen activation instruction.
Figure 7:
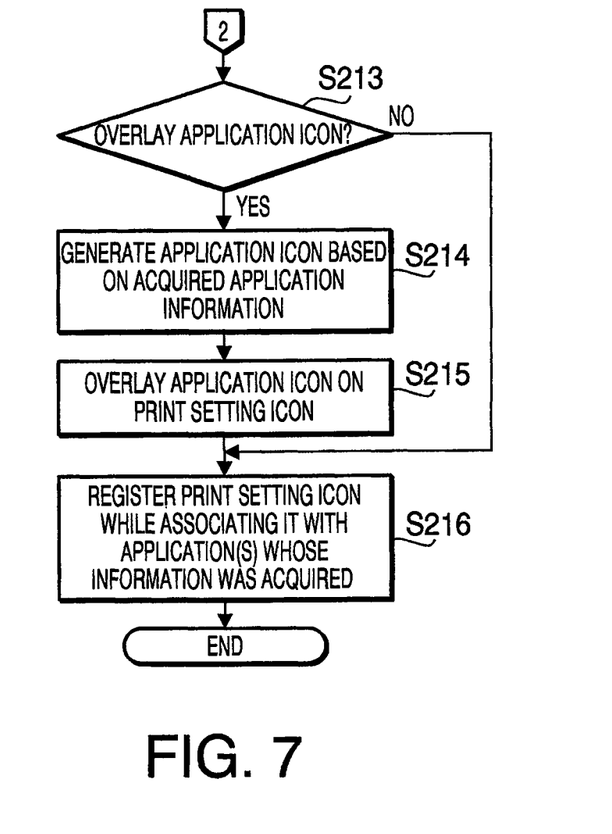
Figure 8:
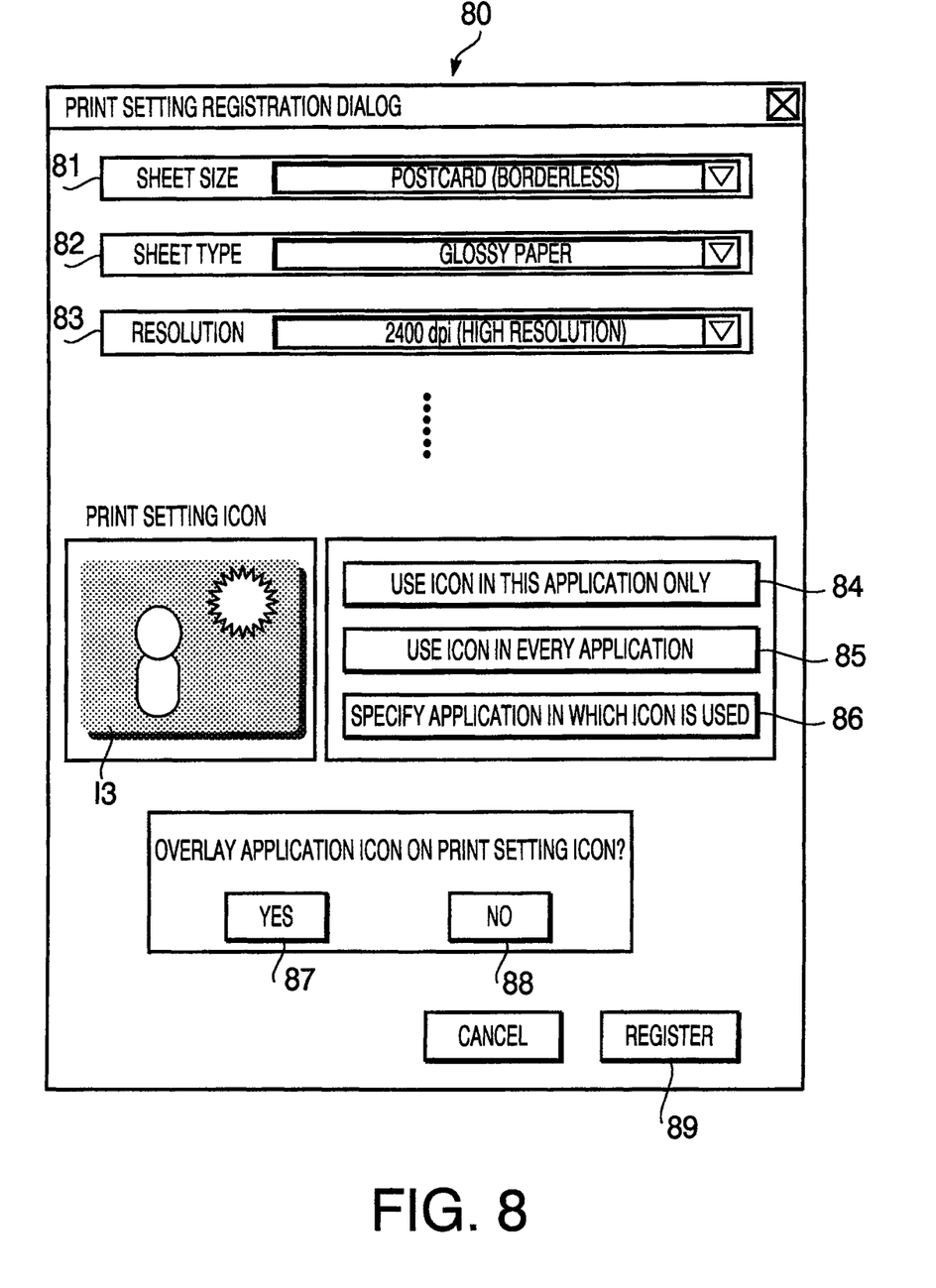
FIG. 8 is a screen image showing an example of a print setting registration UI screen which is displayed on the display unit by the print setting registration UI screen activation process.

When a print setting registration UI screen activation instruction (instruction for the activation of the aforementioned print setting registration UI screen) is issued when an application (A1-A4, etc.) has already been activated (i.e. in operation) on the PC 1, the printer driver D1 is activated and a print setting registration UI screen activation process shown in FIGS. 6 and 7 is executed by the control unit 10. FIGS. 6 and 7 are flow charts showing the print setting registration UI screen activation process. FIG. 8 is a screen image showing an example of the print setting registration UI screen (80) which is displayed on the display unit 15 by the print setting registration UI screen activation process. Each step of the process will be described below.

At the start of the print setting registration UI screen activation process, the control unit 10 executes a process for successively displaying the setting items on the print setting registration UI screen (steps S201-S204 shown in FIG. 6).

First, in the step S201, the control unit 10 acquires information on the application in operation (application that has been activated). For example, when the application A2 has been activated, the control unit 10 acquires information that the application in operation is the application A2.

In the next step S202, the control unit 10 acquires (selects) one setting item from the multiple setting items used for the print setting similarly to the step S102 in FIG. 2 (repeated explanation is omitted here).

In the next step S203, the control unit 10 displays the acquired setting item on the print setting registration UI screen 80. In the example of FIG. 8, setting items "sheet size" (81), "sheet type" (82), "resolution" (83), etc. acquired in S202 have been displayed on the print setting registration UI screen 80 by repeated execution of the step S203.

In the next step S204, the control unit 10 judges whether there exists the next setting item to be acquired. If affirmative in S204 (S204: YES), the control unit 10 returns to the step S202, otherwise (S204: NO) the control unit 10 (which has finished the displaying of all the setting items on the print setting registration UI screen 80) advances to step S205.

In the step S205, the control unit 10 lets the user select desired parameters by operating the setting items 81-83, etc. on the print setting registration UI screen 80 through the input unit 16.

In the next step S206, the control unit 10 generates a print setting icon corresponding to the parameters selected by the user. In the example of FIG. 8, the print setting icon I3, corresponding to the parameters selected by the user from the setting items 81-83, etc., has been generated and displayed in a middle left part of the print setting registration UI screen 80.

After the displaying of the generated print setting icon, the control unit 10 lets the user select one of the three buttons 84-86 displayed in a middle right part of the print setting registration UI screen 80. The button 84 is for registering the print setting icon generated in S206 as one that should be used exclusively in the application in operation. The button 85 is for registering the print setting icon generated in S206 as one that should be used in every application. The button 86 is for letting the user specify applications in which the print setting icon generated in S206 should be used.

In the next step S207, the control unit 10 judges whether or not the print setting icon generated in S206 is one that should be used exclusively in the application in operation. When the user has selected the button 84, the judgment of S207 results in "YES" and the control unit 10 advances to step S213, otherwise (S203: NO) the control unit 10 advances to step S209.

In the step S209, the control unit 10 judges whether or not the print setting icon generated in S206 is one that should be used in every application. When the user has selected the button 85, the judgment of S209 results in "YES". In this case, the control unit 10 acquires information on all the applications that have been installed in the PC 1 (S210) and thereafter advances to the step S213. If negative in S209 (S209: NO), the control unit 10 advances to step S211.

In the step S211, the control unit 10 displays a list of all the applications that have been installed in the PC 1 on the display unit 15 independently of the print setting registration UI screen 80 and lets the user specify applications in which the print setting icon generated in S206 should be used. Subsequently, the control unit 10 acquires information on the applications specified by the user in S211 (S212) and thereafter advances to the step S213.

In the step S213 in FIG. 7 (reached via the step S207, S210 or S212), the control unit 10 lets the user select whether or not an application icon should be overlaid on the print setting icon generated in S206. Specifically, the user selects a "YES" button 87 or a "NO" button 88 displayed in the bottom of the print setting registration UI screen 80 as shown in FIG. 8. When the "YES" button 87 is selected, the judgment of S213 results in "YES" and the control unit 10 advances to step S214. When the "NO" button 88 is selected, the judgment of S213 results in "NO" and the control unit 10 advances to step S216 while skipping S214 and S215.

In the step S214, the control unit 10 generates the application icon based on the application information acquired in S201, S210 or S212. For example, the pen-like icon I5a shown in FIG. 5 (overlaid on the print setting icon I5) is generated as an application icon that represents the application A2 handling text data.

Subsequently, the control unit 10 overlays the application icon on the print setting icon generated in S206 (S215) and thereafter advances to the step S216.

In the step S216 (reached via the step S213 or S215), the control unit 10 registers the print setting icon generated in S206 while associating it with the application(s) whose information was acquired in S201, S210 or S212. In this step, the control unit 10 may also let the user make a final decision on the registration by clicking on a "REGISTER" button 89 (or a "CANCEL" button) displayed at the bottom of the print setting registration UI screen 80. Information on the registered print setting icon is recorded in the control unit 10 or the HDD 14. When the print setting UI screen activation instruction (the instruction for activating the print setting UI screen 90) is issued, the information on the registered print setting icons is read out from the control unit 10 or the HDD 14 as needed and the print setting icons are displayed on the print setting UI screen 90 as explained above.

Thereafter, the control unit 10 ends the display of the print setting registration UI screen 80 and ends the process of FIGS. 6 and 7 ("process in response to a print setting registration UI screen activation instruction").

In the process of FIGS. 6 and 7, the control unit 10 lets the user select desired parameters (S205), generates a print setting icon based on the parameters selected in S205 (S206), and registers the print setting icon generated in S206 while associating it with the application in operation (second registration) (S201, S216), all the applications that have been installed in the PC 1 (S210, S216), or applications specified by the user (third registration) (S201, S216).

With the PC 1 (information processing device) in accordance with this embodiment, the print setting icons can be displayed on the display unit 15 while relatively increasing the display level of the relevant print setting icons (print setting icons relevant to the application that generated the original data) compared to the other print setting icons by the steps S124, S127, S129 and S130. In the concrete example shown in FIGS. 4 and 5, the relevant print setting icon I3, which is relevant to the application A1 (original data-generating application), is displayed larger than its initial size. As for the other print setting icons I1, I2, I4 and I5, only the icons I1, I2 and I5 are displayed in their initial sizes without displaying the icon I4 (print setting icon that should not be displayed in the original data-generating application (S121: NO)).

With the PC 1 configured as above, the user can recognize the relevant print setting icons with higher priority than the other print setting icons. The user is allowed to easily recognize the relevant print setting icons even when there are a lot of print setting icons displayed on the display unit 15. Thus, the PC 1 allows the user to easily find a desired print setting icon in a large number of print setting icons displayed on the display unit 15.

As above, the PC 1 of this embodiment is capable of improving the operability of the print setting.

Further, the PC 1 automatically generates a print setting icon based on the parameters extracted in the steps S111-S114, by which user operations necessary for selecting desired parameters from the setting items relevant to the original data-generating application and newly setting the setting information can be reduced. Thus, the PC 1 is capable of further improving the operability of the print setting.

Once the automatically generated print setting icon is registered in S116, it is unnecessary to generate the same print setting icon (representing the same setting information) from the next time on, by which the efficiency of the information processing can be increased.

In cases where the original data-generating application is an application handling graphic data, a relevant print setting icon allowing for high-definition printing of the original data is automatically generated by the steps S110, S111 and S115. In cases where the original data-generating application is an application handling text data, a relevant print setting icon allowing for high-speed printing of the original data is automatically generated by the steps S112, S113 and S115. Thus, the user is thereafter allowed to select such a relevant print setting icon with ease, by which the operability of the print setting is improved still further.

Further, being capable of generating a print setting icon according to the intention of the user (i.e. a print setting icon corresponding to parameters selected by the user) by the steps S205 and S206, the PC 1 can flexibly meet a wide variety of user needs in the print setting icon registration process.

With the PC 1, the user can specify the application in operation and associate it with the print setting icon which is registered (S201, S207, S216), specify desired applications (e.g. those other than the application in operation) and associate them with the print setting icon which is registered (S209, S211, S212, S216), or specify all the applications installed in the PC 1 and associate them with the print setting icon which is registered (S209, S210, S216) according to the user's intention. Thus, the PC 1 is capable of improving the operability in the print setting icon registration process.

Furthermore, the application icon (e.g. the icon I5a shown in FIG. 4) overlaid on a print setting icon in S214-S216 allows the user to recognize the application(s) relevant to the print setting icon at a glance, by which the operability of the print setting is improved still further.

<Modification>

Figure 9:
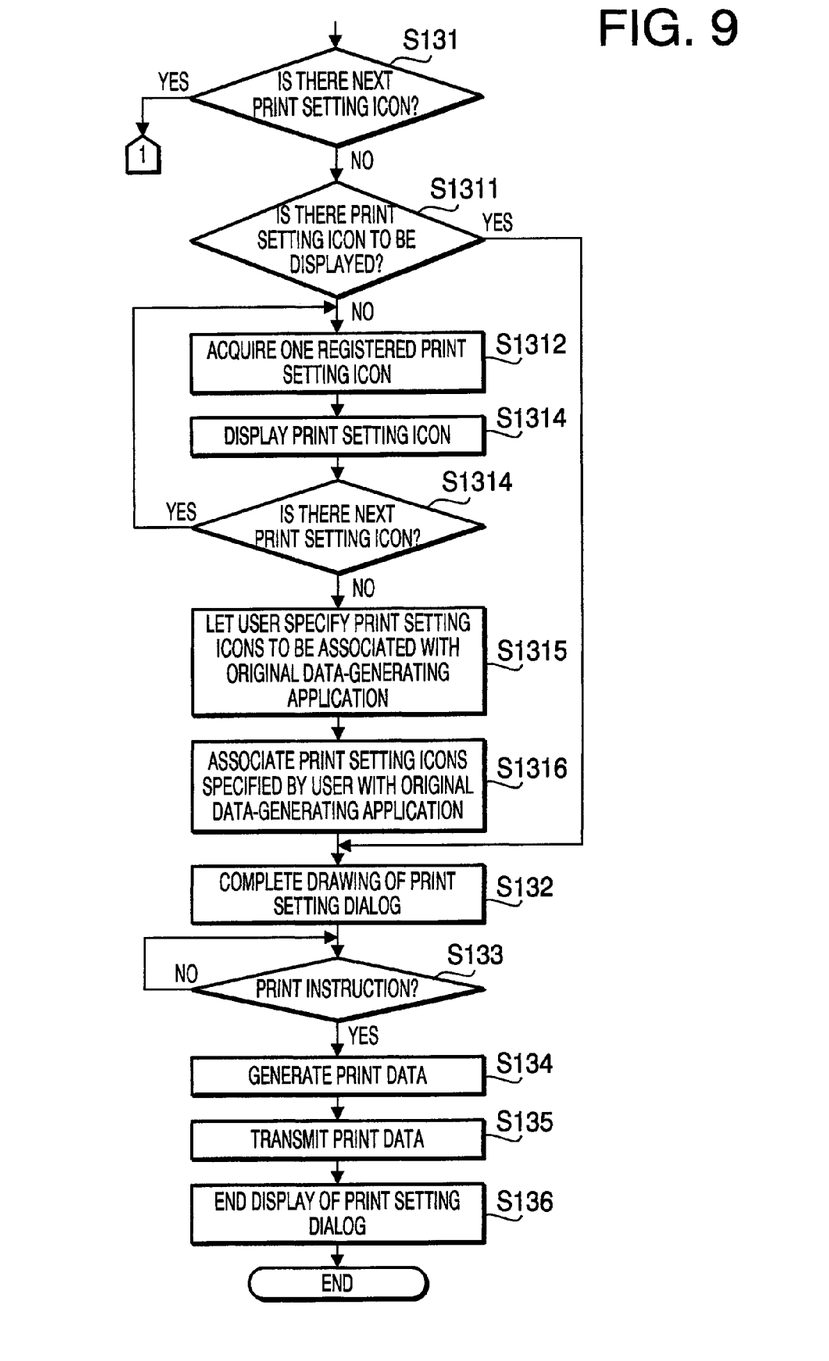
FIG. 9 is a flow chart showing an example of a modification of the process of FIGS. 2 and 3.

FIG. 9 is a flow chart showing an example of a modification of the process of FIGS. 2 and 3. As shown in FIG. 9, steps S1311-S1316 explained below can be added between the steps S131 and S132 of the process of FIGS. 2 and 3. Each step of the process of FIG. 9 will be described below.

After finishing the steps S101-S131 shown in FIGS. 2 and 3 (i.e. when the judgment of S131 in FIG. 3 results in "NO"), the control unit 10 advances to step S1311 shown in FIG. 9 and judges whether there has been found any print setting icon that should be displayed on the print setting UI screen 90 in the end (as the result of the repetition of S120-S130 in FIG. 3). For example, when the number of registered print setting icons is small (e.g. when the user started using the PC 1 recently), there is a case where no print setting icon that should be displayed on the print setting UI screen 90 exists in the end. In this case, the judgment of S1311 results in "NO" and the control unit 10 advances to step S1312. On the other hand, if affirmative in S1311 (S1311: YES), the control unit 10 advances to the step S132 while skipping the steps S1312-S1316.

In the steps S1312-S1314 (executed repeatedly), the control unit 10 displays all the registered print setting icons on the display unit 15.

In the next step S1315, the control unit 10 lets the user specify print setting icons that should be associated with the original data-generating application from the displayed print setting icons.

In the next step S1316, the control unit 10 associates the print setting icons specified by the user in S1315 with the original data-generating application. Thereafter, the control unit 10 advances to the step S132.

In the modification shown in FIG. 9, when no relevant print setting icon (print setting icon relevant to the application that generated the original data) is included in the print setting icons, the user is allowed to specify desired print setting icons as the relevant print setting icons (relevant to (e.g. associated with) the original data-generating application) in the steps S1311-S1316.

In this case, the steps S1311-S1316 serve to reduce the user's trouble of selecting parameters, by which the operability of the print setting is improved still further.

While a description has been given above of a preferred embodiment in accordance with the present invention, the present invention is not to be restricted by the particular illustrative embodiment and a variety of modifications, design changes, etc. are possible without departing from the scope and spirit of the present invention described in the appended claims.

Figure 10:
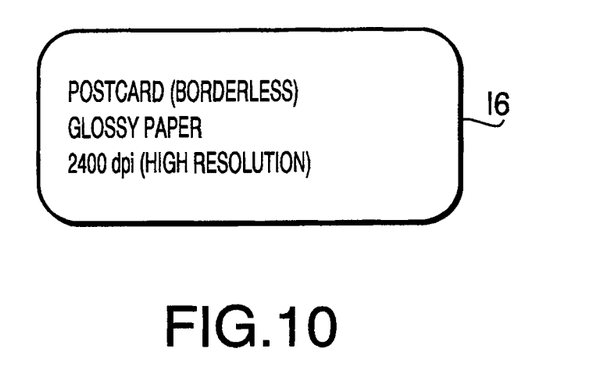
FIG. 10 is a schematic diagram showing a concrete example of an object (superordinate concept of an "icon") which is displayed on the display unit.

For example, it is possible to employ objects (superordinate concept of "icons") like an object I6 shown in FIG. 10 (in which (character strings representing) parameters regarding several setting items are overlaid on a figure) instead of the print setting icons I1-I5 shown in FIG. 5. The object I6, which is formed by overlaying character strings "POSTCARD (BORDERLESS)", "GLOSSY PAPER" and "2400 dpi (HIGH RESOLUTION)" on a substantially rectangular figure, represents postcard printing (borderless printing), glossy paper printing and a high resolution for photo printing. The object I6 allows the user to recognize the corresponding setting information more securely and correctly even though it is larger than the print setting icons I1-I5.

What is claimed is:

1. An information processing device configure to generate print data from original data in accordance with a parameter set and transmit the print data to a printer, comprising:
    a display device;
    a controller; and
    a non-transitory computer-readable memory having executable instructions stored therein, wherein the instructions, when executed by the controller, cause the controller to provide:
    an identifying unit configured to identify an application which has generated original data;
    an object generating unit configured to generate a plurality of objects respectively representing different parameter sets;
    a determining unit configured to determine whether each of the plurality of objects is relevant to the identified application prior to each of the plurality of objects being displayer; and
    a display controlling unit configured to display the plurality of objects on the display device such that a display level of each object determined to be relevant to the identified application and a display level of each object determined not to be relevant to the identified application are differentiated.

2. The information processing device according to claim 1, wherein the determining unit is a first determining unit, wherein the non-transitory computer-readable memory further has executable instructions stored therein, wherein the instructions, when executed by the controller, cause the controller to function as:
    a second determining unit configured to determine a parameter relevant to the identified application; and
    a second object generating unit configured to generate an object representing the determined parameter.

3. The information processing device according to claim 1, wherein the non-transitory computer-readable memory further has executable instructions stored therein, wherein the instructions, when executed by the controller, cause the controller to function as:
    a second object generating unit configured to generate an object relevant to the identified application; and
    a registering unit configured to register the generated object while associating the generated object with the identified application.

4. The information processing device according to claim 2, wherein the second object generating unit is configured to generate an object representing a parameter allowing for high-definition printing when the application is an application that handles graphic data.

5. The information processing device according to claim 2, wherein the second object generating unit is configured to generate an object representing a parameter allowing for high-speed printing when the application is an application that handles text data.

6. The information processing device according to claim 3, wherein: the registering unit is configured to allow a user to select a desired parameter, and the second object generating unit is configured to generate an object representing the desired parameter as the object relevant to the identified application when the desired parameter is selected by the user.

7. The information processing device according to claim 6, wherein the registering unit is configured to register the object generated by the second object generating unit while associating the object with an application in operation.

8. The information processing device according to claim 6, wherein the registering unit is configured to register the object generated by the second object generating unit while associating the object with applications specified by the user.

9. The information processing device according to claim 3, wherein the registering unit is configured to allow a user to register a desired object.

10. The information processing device according to claim 1, wherein the object generating unit is configured to add an application object representing the application to the determined objects representing the parameter sets relevant to the identified application.

11. An information processing method for an information processing device configured to generate print data from original data in accordance with a parameter set and transmit the data to a printer, comprising:
    identifying an application which has generated original data;
    generating a plurality of objects respectively representing different parameter sets;
    determining whether each of the plurality of objects is relevant to the identified application prior to each of the plurality of objects being displayed; and
    displaying the plurality of objects on a display device such that a display level of each object determined to be relevant to the identified application and a display level of each object determined not to be relevant to the identified application are differentiated.

12. The information processing method according to claim 11, further comprising:
    determining a parameter relevant to the identified application; and
    generating an object representing the determined parameter.

13. The information processing method according to claim 11, further comprising:
    generating an object relevant to the identified application; and
    registering the generated object while associating the generated object with the identified application.

14. The information processing method according to claim 13, wherein:
  the registering includes allowing a user to select a desired parameter, and
  the generating includes generating an object based on the desired parameter selected by the user.

15. The information processing method according to claim 14, wherein the registering includes registering the object generated by the object generating while associating the object with an application in operation.

16. The information processing method according to claim 14, wherein the registering includes registering the object generated by the object generating while associating the object with applications specified by the user.

17. A non-transitory computer-readable medium storing computer-readable instructions that, when executed, cause an information processing device configured to generate print data from original data in accordance with a parameter set and transmit the print data to a printer, to perform steps comprising:
  identifying an application which has generated original data;
  generating a plurality of objects respectively representing different parameter sets;
  determining whether each of the plurality of objects is relevant to the identified application prior to each of the plurality of objects being displayed; and
  displaying the plurality of objects on a display device such that a display level of each object determined to be relevant to the identified application and a display level of each object determined not to be relevant to the identified application are differentiated.

18. The information processing device according to claim 1, wherein the display controlling unit is configured to differentiate the determined objects from other objects by varying a display level of the determined objects, wherein varying the display level of the determined objects includes displaying or not displaying each of the determined objects.

19. The information processing device according to claim 1, wherein the determining unit is configured to judge whether a parameter set is relevant to the identified application based on a usage frequency of the parameter set.

20. The information processing device according to claim 1, wherein:
  the display controlling unit is configured to judge whether the display level of a determined object is to be varied based on a usage frequency of the determined object, and
  the display controlling unit is configured to differentiate the determined objects from other objects by varying the display level of the determined object when the display controlling unit judges that the display level of the determined object is to be varied.

21. The information processing device according to claim 1, wherein the non-transitory computer-readable memory further has executable instructions stored therein, wherein the instructions, when executed by the controller, cause the controller to function as:
  a second object generating unit configured to generate an object relevant to the identified application.

* * * * *